Patented Oct. 14, 1924.

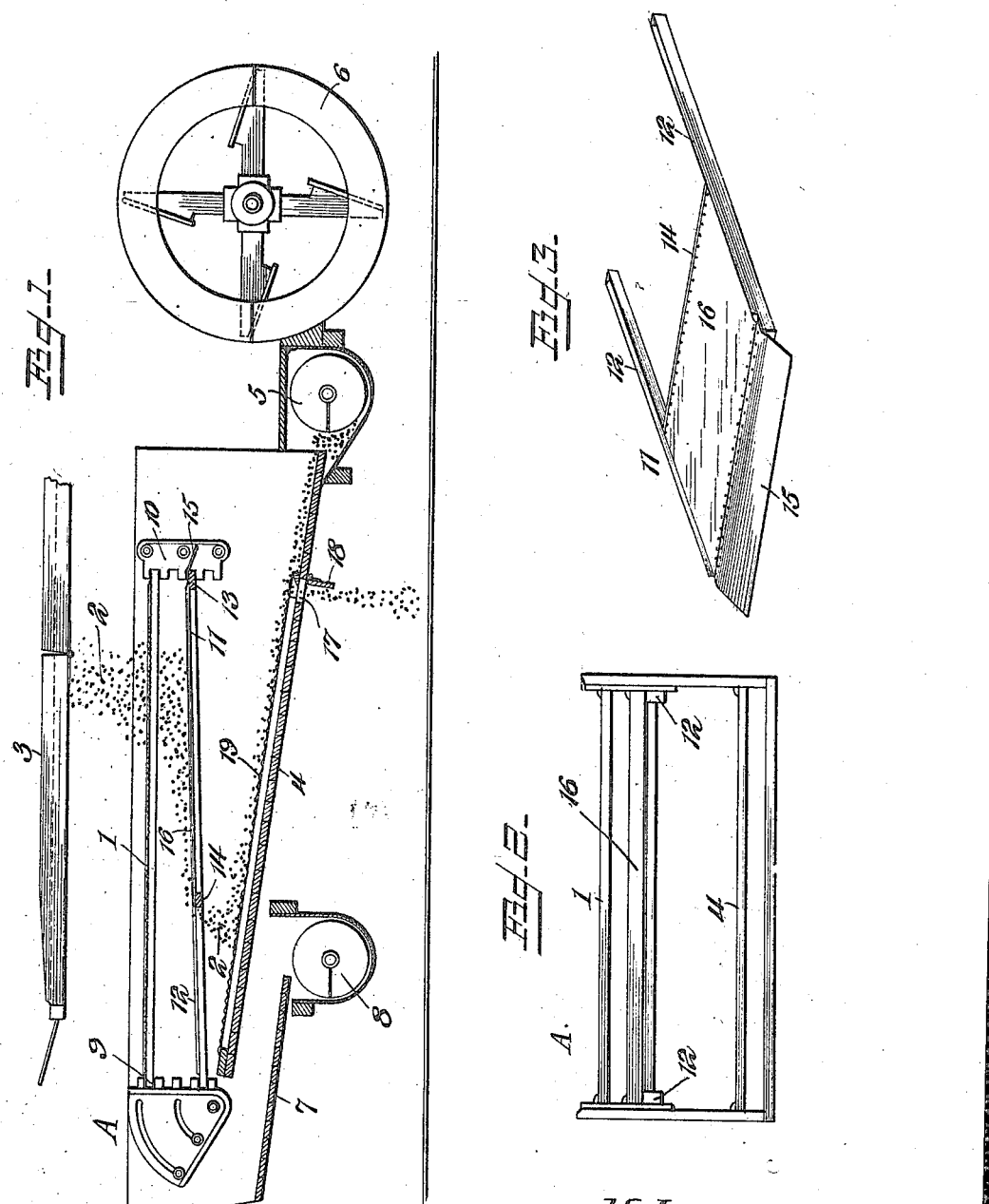

1,511,734

UNITED STATES PATENT OFFICE.

HANS LARSEN, OF SASKATOON, SASKATCHEWAN, CANADA.

MEANS FOR SEPARATING WEED SEED FROM GRAIN.

Application filed August 6, 1921. Serial No. 490,432.

*To all whom it may concern:*

Be it known that I, HANS LARSEN, residing at Saskatoon, in the Province of Saskatchewan and Dominion of Canada, have invented a new and useful Improvement in Means for Separating Weed Seed from Grain, of which the following is a specification.

This invention has reference to means for separating weed seed from grain, in order to reduce the increasing contamination of grain fields by the growth of weeds.

Weed seed separators have heretofore proved to be so inefficient that there is danger of weeds gaining the mastery in the course of time, especially as weeds are prolific growers and tend to ultimately choke out the grain, or greatly reduce the crop.

As weed seed separators are ordinarily constructed, the weed seed in large part finds its way to the conveyer, receiving the separated grain. In accordance with the present invention the weed seed and the grain are caused to reach a weed seed directing plate at so great a distance from the grain conveyer, that the weed seed are subjected for a sufficiently prolonged length of time to the winnowing stream of air, that the weed seed become separated from the grain, and are allowed to pass therefrom by another path, so that the grain, which is heavier than the weed seed, may flow beyond the weed seed, and so be separated from and escape uncontaminated by the weed seed.

The invention will be best understood from a consideration of the following detailed description, taken in connection with the accompanying drawing forming part of this specification with the understanding, however, that the invention is not confined to any strict conformity with the showing of the drawing, but may be changed and modified, so long as such changes and modifications mark no material departure from the salient features of the invention as expressed in the appended claims.

In the drawings:

Fig. 1 is a vertical longitudinal section, more or less diagrammatically illustrating a grain separator with the invention applied thereto.

Fig. 2 is an end elevation of the shoe of the separator illustrating the arrangement of the screens.

Fig. 3 is a perspective view of an imperforate weed seed conveyer plate, embodying the invention.

Referring to the drawing, there is shown a shoe A, more or less diagrammatically illustrating a grain separator of known form, with a screen 1, which may follow the usual practice, and this screen receives a stream of mixed grain and weed seed from an ordinary chaffer 3, through which chaffer and because of the oscillation thereof, the grain which is heavier than the weed seed, gets very near the bottom, and would pass down at the front of the sieve or screen under ordinary conditions, wherefore the weed seed is then not separated properly but passes onto the grain and causes more or less contamination thereof. The screen or sieve 1, and the chaffer 3, being of ordinary construction, needs no particular description.

The shoe A is provided with a grain bottom 4, slanting from the front end downwardly toward the rear end, where the bottom 4 discharges into a grain auger 5, which may be of customary construction. Adjacent to that end of the separator provided with the auger 5, is a winnowing fan or blower 6, which may be of standard form found in grain separators and so need not be specifically described.

At the other end of the bottom portion of the shoe A, there is located a tailings bottom 7, and this also requires no specific description, and is so constructed as to discharge into a tailings auger 8.

At opposite ends of the shoe A are supporting racks 9, 10, respectively for the sieve or screen 1, and for a weed seed directing means 11, the racks being adapted to support the named parts 1 and 11, and particularly the directing means 11, in differently adjusted positions, in accordance with conditions.

The weed seed directing means 11 shown in detail in Figure 3, comprises a frame formed of side bars 12 of sufficient length to extend between and seat at the ends in the supporting racks 9 and 10, and at one end the side bars 12 are connected by a cross bar 13, while at an intermediate point between their ends they are connected by another cross bar 14. Carried by the cross bar 13 is an inclined deflecting plate 15, to gather the proper amount of air to thoroughly clean the grain. This plate is inclined downwardly more or less to properly convey the wind from the fan 6 under the sieve.

Mounted on the side bars 12 and the cross bars 13 and 14, is a plate 16, of imperforate material, such, for instance, as sheet iron, and is designed to be located in the path of the falling stream 2 of grain and seed. By slanting the plate 16 downwardly from that end of the shoe A toward the fan, to near the high end of the grain bottom 4 of the shoe, both the grain and the weed seed are caused to travel together along the length of the shoe before dropping to the grain bottom of the shoe, with the stream 2 falling over the forward edge of the plate 16 at a material distance from the auger 5, whereby the stream 2 has a considerable distance to travel in opposition to the stream of air driven by the fan 6 over such stream of grain and weed seed.

In the grain bottom 4 of the shoe, adjacent to the auger 5 but still removed therefrom by a short distance, is an opening 17, capable of being closed by a door 18. As the stream 2 of mixed grain and seed flows down the shoe bottom 4 over the screen covering it, the stream of air furnished by the fan 6 holds back the weed seed, which pass through the screen 19, covering the floor 4, up to the opening 17, and the seed ultimately gravitates through the opening 17 to a suitable point of disposal. The grain, however, flows beyond the lower end of the screen 19, being unaffected by the stream of air from the fan 6, and passes along the bottom 4 beyond the end of the screen 19 to finally reach the auger 5 and pass thereinto as thoroughly cleaned or winnowed grain to said auger for proper disposal. In case no weed seed is present, it is unnecessary to have the door 18 open, and it may then be closed.

The main feature of this invention resides in the imperforate weed seed directing means 11, and the deflecting plate 15, whereby the mixture of seed and grain is caused to have a much longer travel under the influence of the winnowing stream of air, than would occur in the absence of the imperforate plate 11, for the plate 11 may be made as long as experience dictates, and this without necessitating any material departure from the form of grain separators as heretofore constructed, and permitting the utilization of existing machines for the purpose, modified only by the addition of the plate 11 and supporting parts therefor.

What is claimed is:—

1. In a grain separator, the combination with a shoe, spaced racks supported therein, a screen supported by said racks, a frame formed of side bars and cross bars engaging at its ends said racks, an imperforate plate extending from that end of the frame nearest to the winnowing fan of the separator partway along the side bars and spaced vertically from said screen, said plate being disposed below that portion of said screen from the end of the screen nearest to the winnowing fan and extending back over half the length thereof, whereby all the weed seed and grain falling from said screen is caught by said imperforate plate, and an inclined deflecting plate extending from said frame beyond its connection with one of the racks toward the fan.

2. In a grain separator, the combination of a shoe, an upper screen carried thereby, a fan for winnowing seed as it passes onto and through the screen, a lower screen for the shoe, a bottom beneath the lower screen having an outlet door for discharging the weed seed which passes through the lower screen, the bottom being extended beyond the lower edge of the lower screen to the end of the shoe nearest the winnowing fan to form a grain bottom for receiving grain that passes over said lower screen, and a conveyer for receiving the grain as it is discharged from said bottom.

3. In a grain separator, the combination of a shoe, an upper and a lower screen carried thereby, a fan arranged to winnow weed seed and grain falling from said upper screen, an imperforate plate interposed between said screens whereby to prolong the time during which the mixture of seed is subjected to the effects of the air blast, a bottom beneath the lower screen having an outlet door for discharging the weed seed which passes through said lower screen, the bottom being extended beyond the lower edge of the lower screen to the end of the shoe nearest to said fan to form a grain bottom for receiving grain that passes over said screen, a deflecting plate inclined downwardly from the edge of the imperforate plate nearest the fan to deflect the air blasts to the upper screen, a tailings bottom beneath the discharge end of the upper screen, and screw conveyers into which the tailings bottom and the grain bottom discharge respectively.

In testimony that I claim the foregoing as my own I have hereto affixed my signature.

HANS LARSEN.